Figure 6:
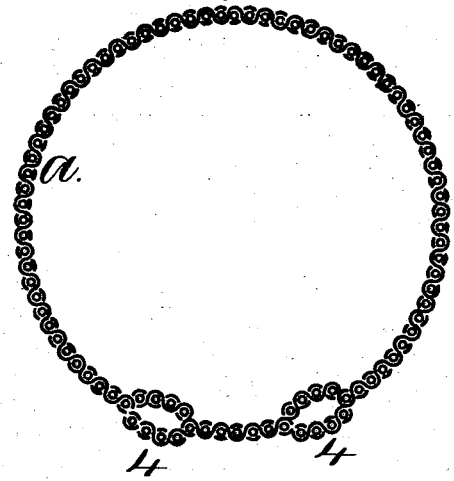

(No Model.) 2 Sheets—Sheet 1.
J. LYALL.
WOVEN FABRIC FOR WHEEL TIRES.
No. 505,949. Patented Oct. 3, 1893.
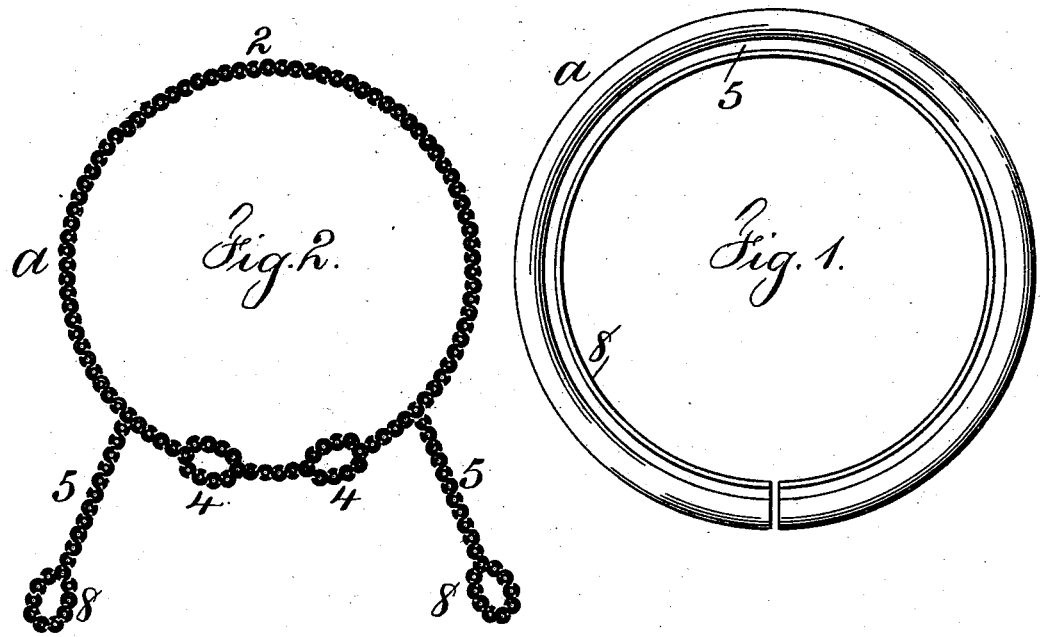
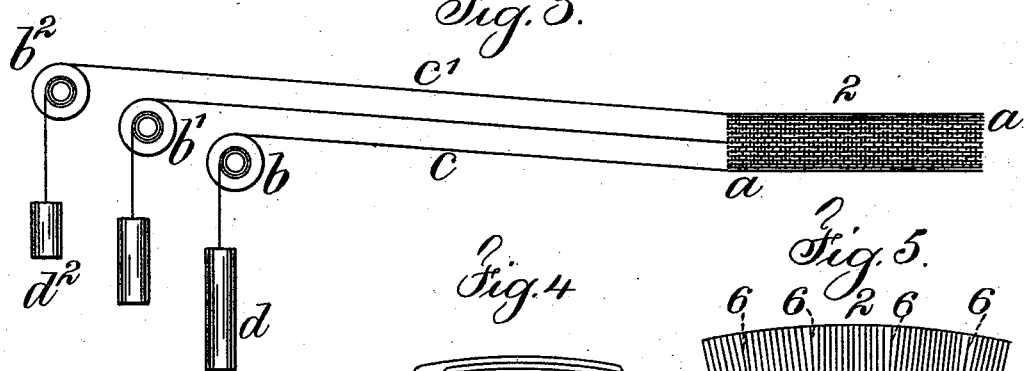
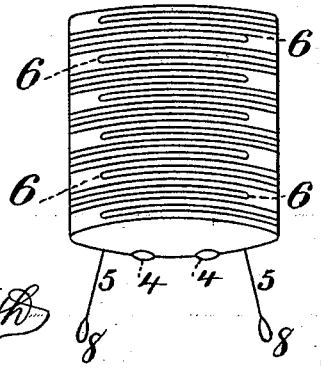
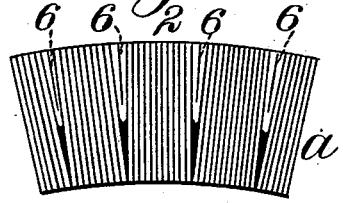
Witnesses
Chas. H. Smith
J. Staib
Inventor
James Lyall
per Lemuel W. Serrell
Atty.

(No Model.) 2 Sheets—Sheet 2.

J. LYALL.
WOVEN FABRIC FOR WHEEL TIRES.

No. 505,949. Patented Oct. 3, 1893.

Witnesses
Chas. H. Smith
J. Staib

Inventor
James Lyall
per Lemuel W. Serrell
Atty.

UNITED STATES PATENT OFFICE.

JAMES LYALL, OF NEW YORK, N. Y.

WOVEN FABRIC FOR WHEEL-TIRES.

SPECIFICATION forming part of Letters Patent No. 505,949, dated October 3, 1893.

Original application filed December 27, 1892, Serial No. 456,326. Divided and this application filed July 12, 1893. Serial No. 480,252. (No specimens.)

*To all whom it may concern:*

Be it known that I, JAMES LYALL, a citizen of the United States, residing in the city and State of New York, have invented an Improvement in Woven Fabrics for Wheel-Tires, of which the following is a specification.

This application is a division of an application, Serial No. 456,326, filed by me December 27, 1892.

In bicycles, tricycles and other vehicles the wheel tires have been elastic, and in many instances inflatable, and such wheel tires have been surrounded by or made upon woven fabrics or canvas for protecting such elastic tires and for aiding in connecting the same with the metal portions of the wheel, but in order to provide for the fabric accommodating itself to the circular or tubular form of the elastic tire and to the diameter of the wheel, the fabric has usually been cut on the bias so as to stretch more or less in the direction of the periphery of the wheel.

My present application relates to a tube of fabric adapted to be coiled into a circle of a diameter corresponding to the wheel tire to which it is to be applied and having formed with it flaps, wings, pockets or other devices adapted to be employed in connecting the tire to the wheel.

Various looms have heretofore been made adapted to weaving cylindrical fabrics such as lamp wicks, and the fabrics required in the construction of india rubber hose. In my present invention the fabric is not only tubular, but it is woven with one side of the tube much longer than the other side, so that such tubular fabric assumes a circular or coiled form corresponding or nearly so to the wheel to which it is to be applied. The warp threads are supplied from separate spools or beams, one for each thread or for each group of threads, so that some warps may be taken up faster than other warps, and the weft thread is laid into the fabric as woven so as to pass around such fabric, the tube being woven substantially in the form of two flat layers joined at their edges, and the weft threads pass across through the top part of the fabric and return through the bottom part of the fabric. In this mode of weaving, the fabric will be slightly coarser or more open on the longer side of the tube than on the shorter or inner side. If this is not desired, this tubular fabric may be woven nearly uniform and so that it will assume a circular form when in use if the weft threads are folded backward and forward upon themselves for the required distances, so as to increase the length of the tubular fabric at one side thereof to the desired extent. In many kinds of looms the warps are supplied from spools or from sectional beams, so that some warps may be taken up faster than others. I make use of either separate spools or sectional beams for the warp threads, so that such threads will be taken up faster in those portions of the fabric that are at the outer side of the coiled tube than at the inner side thereof.

In Figure 1 I have illustrated the coiled tube by a side elevation. Fig. 2 is a section of the tube in larger size. Fig. 3 illustrates the manner of supplying the warps. Fig. 4 is a diagram illustrative of the weft threads as laid to increase the length of fabric at one side, and Fig. 5 is a side view of part of the tube illustrative of the direction of the weft threads. Figs. 6, 7, 8 and 9 are diagrams illustrative of the parts that may be provided with the woven tube.

The warp threads are supplied from separate spools or sectional beams; this is illustrated in Fig. 3, in which the tubular fabric is shown at $a\ a$ sidewise and in the flat condition it occupies while being woven. The warps are supplied from the desired number of separate spools $b\ b'\ b^2$ or from sectional beams, and the warps $c$ are kept under more tension than the warps $c'$, so that the warps $c'$ that come at the longer side 2 of the tube as it is coiled may be under less tension and hence will be beat up more in the weaving than the warps $c$ which are under greater tension and hence are shorter than the warps $c'$, and the intermediate warps are under proportionate tension, decreasing gradually from the greater tension on the warps $c$ to the less tension on the warps $c'$. To illustrate this difference of tension the weights $d^2$ applying friction to the spools $b^2$ are shown as smaller than the weights $d$ that apply tension to the warps $c$.

Any desired tension may be applied to the warps or such warps may be moved automatically by feed rolls that supply such warps in the proper proportion to the respective sides of the tube so that the same can be coiled into the circle of the wheel, and when the tube is distended the warps will be under the same tension or nearly so throughout the tubular fabric.

It is to be understood that the warps can be manipulated by suitable heddles or heddle motion or by Jacquard mechanism, so that the weft threads may pass around the tube; that is to say across one side and then across the other as the two sides of the tube lie flatwise together and thus progress regularly through the top and bottom sheds, and in some instances the weft threads go backward and forward in the one shed to increase the length of the fabric at the desired places, as illustrated at 6, Figs. 4 and 5, before passing through the other shed, hence the tube that is delivered by the aforesaid weaving operation is of nearly uniform strength of fabric throughout and of nearly uniform appearance, and in addition to being tubular in its sectional form, as represented in Fig. 2, it also assumes a curved form that eventuates in a coil of the diameter corresponding to or adapted to use with a bicycle or other wheel of the given diameter, as illustrated in Fig. 1, and in manipulating the weft threads so as to properly lay in the warp threads reference should be had to the diameter of the wheel with which this fabric is to be employed, in order that such woven tubular fabric may assume as near as desired the shape of the elastic tire of the wheel, hence all portions of the fabric will receive the proper and proportionate strain when in use and the elastic wheel tire will be much stronger and more perfect than those made with the strip of fabric cut bias, as heretofore usual.

Where it is desired to employ wires or ribs in connection with the tubular fabric, these wires or ribs may be clamped to or by the felly of the wheel or the devices thereon, and this fabric may be woven with one or more longitudinal pockets as represented at 4 into which the wires, ribs or similar devices are introduced, as seen in Fig. 6, and where the tubular woven fabric requires flaps or longitudinal wings projecting from one or more of the sides of such tubular fabric, such flaps or wings are woven with the rest of the fabric and project therefrom and of the desired width, as represented at 5.

Figure 8:
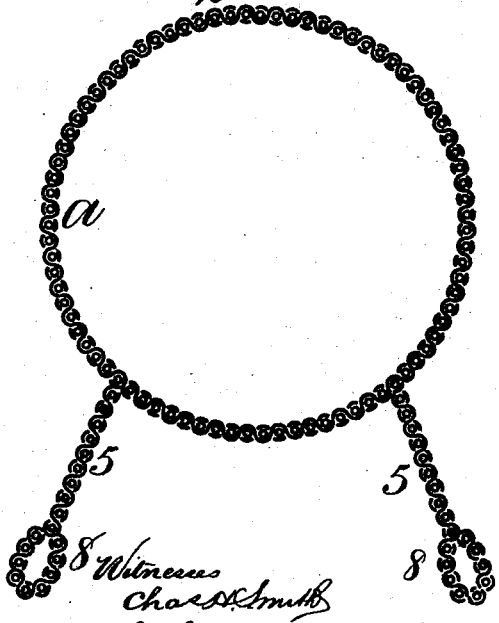

The pockets 8 may be provided at the edges of the flaps or wings 5 for the reception of wires, strips or similar devices that can be clamped in connecting the fabric to the wheel, as seen in Figs. 2 and 8.

Figure 7:
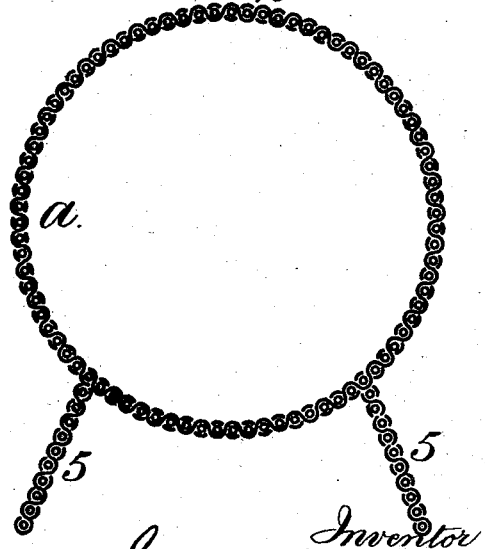

It is to be understood that all the parts shown in Fig. 2 may be in one article or the pockets 4 may be left out when the wings 5 are provided as seen in Fig. 7.

Figure 9:
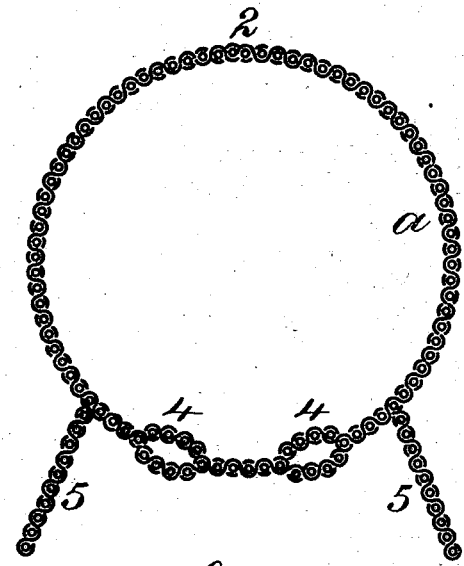

Fig. 8 illustrates the tube with the flaps 5 and pockets 8, and Fig. 9 shows the tube with the pockets 4 and flaps 5.

In my said application Serial No. 456,326, the tube woven with warp threads longer at one side than at the other so that the tube assumes a circular or coiled form adapted to the wheel upon which it is to be used, is set forth and claimed. The present application relates to a tubular fabric having means for attaching the same to a wheel and to a tubular fabric with an increased number of picks of weft thread on the long side of the tube.

I claim as my invention—

1. As a new article of manufacture, a woven tubular fabric having the warp threads laid in to form a greater length at one side of the tube than at the other, so that such tube will assume a circular or coiled form adapted to the wheel upon which it is to be employed, and means woven with such tube for securing the tube in place, substantially as specified.

2. As a new article of manufacture, a woven tubular fabric having warp threads laid in to form a greater length at one side of the tube than at the other, so that such tube will assume a circular or coiled form adapted to the wheel upon which it is to be employed, and one or more flaps woven as projecting wings running longitudinally of the tubular fabric for attaching the same to the felly of the wheel, substantially as specified.

3. As a new article of manufacture, a woven tubular fabric having longitudinal warp threads and the weft threads laid back and forth to increase the number of picks at one side of the tube and cause it to assume a circular or coiled form adapted to the wheel upon which it is to be employed, substantially as specified.

4. As a new article of manufacture, a woven tubular fabric adapted to be coiled into a circular form for a wheel tire and having means woven with such tube for securing the tube in place, substantially as set forth.

Signed by me this 6th day of July, 1893.

JAMES LYALL.

Witnesses:
GEO. T. PINCKNEY,
A. M. OLIVER.